(12) United States Patent
Schlitzkus et al.

(10) Patent No.: US 9,517,757 B2
(45) Date of Patent: Dec. 13, 2016

(54) HYDRAULIC BLOCK FOR A HYDRAULIC ASSEMBLY OF A SLIP-REGULATED, HYDRAULIC VEHICLE BRAKE SYSTEM, AND A HYDRAULIC VEHICLE BRAKE SYSTEM

(71) Applicant: Robert Bosch GmbH, Stuttgart (DE)

(72) Inventors: Michael Schlitzkus, Dietmannsried (DE); Juergen Tandler, Fuessen (DE); Matthias Mayr, Rettenberg (DE); Andreas Weh, Sulzberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/648,596

(22) PCT Filed: Oct. 7, 2013

(86) PCT No.: PCT/EP2013/070821
§ 371 (c)(1),
(2) Date: May 29, 2015

(87) PCT Pub. No.: WO2014/082779
PCT Pub. Date: Jun. 5, 2014

(65) Prior Publication Data
US 2015/0321650 A1 Nov. 12, 2015

(30) Foreign Application Priority Data
Nov. 30, 2012 (DE) .................. 10 2012 221 980

(51) Int. Cl.
*B60T 8/36* (2006.01)
*B60T 8/48* (2006.01)

(52) U.S. Cl.
CPC .............. *B60T 8/368* (2013.01); *B60T 8/4872* (2013.01); *Y10T 137/1842* (2015.04)

(58) Field of Classification Search
CPC .............. B60T 8/36; B60T 8/38; B60T 8/346; B60T 8/368; B60T 8/4059; B60T 8/4881; B60T 13/142; B60T 15/028; B60T 17/02; F15B 21/00; F15B 13/0814; F15B 13/0871
(Continued)

(56) References Cited

U.S. PATENT DOCUMENTS 7,204,566 B2 * 4/2007 Otomo .................... B60T 8/367
303/119.3
7,530,649 B2 * 5/2009 Kusano .................. B60K 6/365
303/113.3
(Continued)

FOREIGN PATENT DOCUMENTS

DE 199 59 670 A1 6/2000
DE 10 2006 059 924 A1 6/2008
(Continued)

OTHER PUBLICATIONS

International Search Report corresponding to PCT Application No. PCT/EP2013/070821, mailed Dec. 12, 2013 (German and English language document) (10 pages).

*Primary Examiner* — Christopher Schwartz
(74) *Attorney, Agent, or Firm* — Maginot, Moore & Beck LLP

(57) ABSTRACT

A hydraulic block for a hydraulic assembly of a slip-regulated, hydraulic vehicle brake system, comprises a first plurality of receivers aligned in a first row that are each configured to fluidly connect to a respective brake pressure, and a second plurality of receivers aligned in a parallel second row that are each configured to fluidly connect to a respective brake pressure reduction valve. The second row is spaced from the first row in a first direction. The hydraulic block further comprises a first further receiver that fluidly connects to a brake master cylinder pressure sensor. The first
(Continued)

further receiver is located perpendicularly offset from the first row in a second direction opposite the first direction and within a plane extending between two of the first plurality of receivers and between two of the second plurality of receivers and that is outside of a center plane defined by the hydraulic block.

18 Claims, 3 Drawing Sheets

(58) Field of Classification Search
USPC .............................. 303/10, 119.3, DIG. 10
See application file for complete search history.

(56) References Cited

U.S. PATENT DOCUMENTS

| | | | | |
|---|---|---|---|---|
| 8,186,770 B2* | 5/2012 | Klug | ............... | B60T 8/4059 |
| | | | | 303/11 |
| 8,414,089 B2* | 4/2013 | Feigel | ............... | B60T 8/4881 |
| | | | | 303/113.1 |
| 8,500,218 B2* | 8/2013 | Fischbach-Borazio | . | B60T 8/368 |
| | | | | 303/10 |
| 8,622,486 B2* | 1/2014 | Tandler | ............... | B60T 8/368 |
| | | | | 303/10 |
| 8,840,196 B2* | 9/2014 | Hitzel | ............... | B60L 7/24 |
| | | | | 303/10 |
| 2003/0222497 A1* | 12/2003 | Fey | ............... | B60T 7/06 |
| | | | | 303/113.1 |
| 2004/0090115 A1* | 5/2004 | Inoue | ............... | B60T 8/368 |
| | | | | 303/119.3 |
| 2006/0049689 A1 | 3/2006 | Marlhe et al. | | |
| 2006/0138860 A1* | 6/2006 | Hinz | ............... | B60T 8/368 |
| | | | | 303/119.3 |
| 2010/0276925 A1* | 11/2010 | Bareiss | ............... | B60T 8/368 |
| | | | | 285/125.1 |
| 2011/0062773 A1 | 3/2011 | Misunou et al. | | |
| 2014/0306514 A1* | 10/2014 | Foitzik | ............... | B60T 13/142 |
| | | | | 303/6.01 |

FOREIGN PATENT DOCUMENTS

| | | |
|---|---|---|
| DE | 10 2007 054 697 A1 | 6/2008 |
| DE | 10 2009 052 485 A1 | 5/2011 |
| JP | 2002-308078 A | 10/2002 |
| WO | 2012/072319 A1 | 6/2012 |

* cited by examiner

HYDRAULIC BLOCK FOR A HYDRAULIC ASSEMBLY OF A SLIP-REGULATED, HYDRAULIC VEHICLE BRAKE SYSTEM, AND A HYDRAULIC VEHICLE BRAKE SYSTEM

This application is a 35 U.S.C. §371 National Stage Application of PCT/EP2013/070821, filed on Oct. 7, 2013, which claims the benefit of priority to Serial No. DE 10 2012 221 980.3, filed on Nov. 30, 2012 in Germany, the disclosures of which are incorporated herein by reference in their entirety.

The disclosure concerns a hydraulic block for a hydraulic assembly of a slip-regulated hydraulic vehicle brake system. In detail, the disclosure concerns a drilling of such a hydraulic block, i.e. details of an arrangement of hydraulic components of a slip control system on and in the hydraulic block, and their hydraulic connections in the hydraulic block. The disclosure also concerns a hydraulic vehicle brake system.

BACKGROUND

Such hydraulic blocks are known. They are typically squat, cuboid metallic blocks for installation of hydraulic components such as hydraulic pumps, magnetic valves, hydraulic accumulators and damper chambers of a slip-regulated vehicle brake system. The hydraulic blocks hold the hydraulic components mechanically and connect them hydraulically through typically drilled connecting lines. A hydraulic block fitted with the hydraulic components forms a hydraulic assembly and is the core of the slip control system. 'Squat' means that hydraulic blocks often have a thickness which is around one-quarter to one-third, and rarely more than half, of the length and width. In top view, the hydraulic blocks are rectangular and often approximately square. The hydraulic block normally contains only hydraulic parts of the components. Electromechanical parts, such as coils and rotors of the magnetic valves, protrude from the hydraulic blocks. Also, an electric motor for driving the hydraulic pumps is attached to the outside of the hydraulic block.

Such a hydraulic block is known from publication DE 10 2006 059 924 A1. The known hydraulic block has receivers for brake pressure build-up valves and for brake pressure reduction valves. The receivers for the brake pressure build-up valves are arranged in the hydraulic block next to each other in a row. The receivers for the brake pressure reduction valves are arranged in the hydraulic block in a further row parallel to the row of receivers for the brake pressure build-up valves.

SUMMARY

The subject of the disclosure is the arrangement of a receiver for a brake master cylinder pressure sensor and/or a pressure sensor for a brake circuit of a vehicle brake system in the hydraulic block, and its hydraulic connections to other hydraulic components of a slip control system of the vehicle brake system. The brake master cylinder pressure sensor measures a pressure in a brake circuit of a master brake cylinder typically actuated by muscular force or a servo control, to which the hydraulic block is connected via one brake line per brake circuit. In one embodiment, the receiver for the brake master cylinder pressure sensor is arranged outside the two rows for the brake pressure build-up valves and the brake pressure reduction valves. Preferably, the receiver for the brake master cylinder pressure sensor is arranged on the side of the brake pressure build-up valves. Also the receiver for the brake master cylinder pressure sensor is arranged outside a central plane, in a plane parallel to the central plane and perpendicular to the two rows of receivers for the brake pressure build-up valves and brake pressure reduction valves, which plane lies between two receivers for brake pressure build-up valves and between two receivers for brake pressure reduction valves. In other words, the receiver for the brake master cylinder pressure sensor lies at a corner of a theoretical triangle, the other two corners of which lie in the receivers of two brake pressure build-up valves, wherein the receiver for the brake master cylinder pressure sensor is arranged on a side of the receivers for the brake pressure build-up valves facing away from the receivers for the brake pressure reduction valves.

One embodiment provides for arrangement of a receiver for a pressure sensor for a brake circuit of the vehicle brake system in the hydraulic block. According to such an embodiment, the receiver for the pressure sensor for a brake circuit is arranged in a central plane of the hydraulic block between two receivers for brake pressure build-up valves and between two receivers for brake pressure reduction valves. Preferably, according to certain embodiments, the hydraulic block has two receivers for two pressure sensors for the two brake circuits of a dual circuit vehicle brake system, which are both arranged in the described center plane of the hydraulic block, wherein one of the two receivers is arranged outside the two rows of receivers for the brake pressure build-up valves and for the brake pressure reduction valves, and the other receiver for the pressure sensor of the other brake circuit is arranged between the two rows of receivers for the brake pressure build-up valves and the brake pressure reduction valves. According to another embodiment, the two receivers for the two pressure sensors for the two brake circuits are arranged on opposite sides of the hydraulic block, i.e. for example on a top and a bottom side.

The object of the disclosure is a favorable arrangement of the receiver for the brake master cylinder pressure sensor and/or the receiver or receivers for the pressure sensor or sensors for the brake circuits of the vehicle brake system in the hydraulic block, with a view to a space-saving, compact arrangement of hydraulic components in and on the hydraulic block, and in view of shorter and/or less angled connection lines in the hydraulic block. Also the suitability of the hydraulic block for predrilling must be guaranteed. Short and less angled connection lines of the pressure sensors are advantageous because a brake pressure is seldom constant, but normally fluctuates continually and sometimes at high speed. Long and angled lines choke the pressure changes and can create pressure reflections, adversely affecting the measurement result. Short and less angled connection lines of the receivers for pressure sensors in the hydraulic block improve the measurement result and the slip regulation.

The arrangement of the receiver or receivers for the pressure sensor or sensors for the brake circuit or circuits of the vehicle brake system in the hydraulic block is independent of the presence and arrangement of the receiver for the brake master cylinder pressure sensor; the features of some particular embodiments described may be implemented in other described embodiments of the disclosure.

The claims concern advantageous embodiments and refinements of the disclosure.

One embodiment is directed to a hydraulic vehicle brake system comprising a pressure sensor in at least one brake circuit, which can also be designated a circuit pressure sensor. Wheel pressure sensors are not required. Consequently the number of pressure sensors is reduced and better slip regulation is possible if the brake pressures in the brake circuits are known.

BRIEF DESCRIPTION OF THE DRAWINGS

The disclosure is now explained in more detail with reference to an exemplary embodiment. The drawings shows.

The hydraulic block is drawn transparently to reveal its drillings. The drawings should be regarded as diagrammatic and simplified depictions for understanding and explanation of the disclosure.

DETAILED DESCRIPTION

Figure 1:
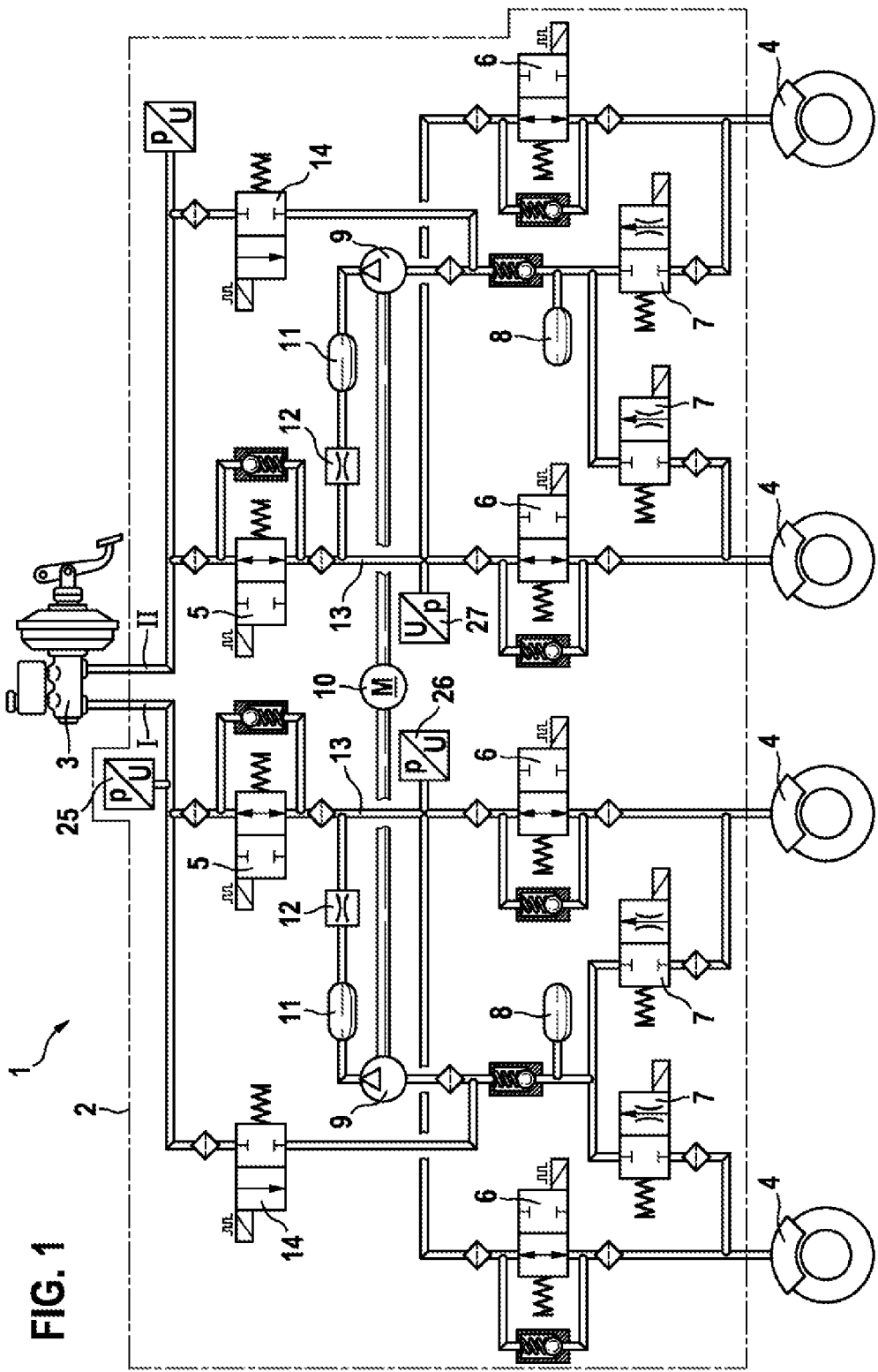
FIG. 1 a hydraulic circuit diagram of a slip-regulated, hydraulic vehicle brake system according to the disclosure.

The slip-regulated, hydraulic, dual circuit vehicle brake system 1 shown in FIG. 1 comprises a hydraulic assembly 2, a dual circuit brake master cylinder 3 to which the hydraulic assembly 2 is connected, and wheel brakes 4 which are connected to the hydraulic assembly 2. The hydraulic assembly 2 comprises the hydraulic components, listed in the paragraph below, of a slip control system of the vehicle brake system 1.

Each brake circuit I, II of the vehicle brake system 1 is connected to the brake master cylinder 3 via a shut-off valve 5. The wheel brakes 4 are connected to the shut-off valves 5 via brake pressure build-up valves 6. In each brake circuit I, II, a hydraulic accumulator 8 and a suction side of a hydraulic pump 9 are connected to the wheel brakes 4 via brake pressure reduction valves 7. The two hydraulic pumps 9, often also designated return pumps, are jointly driven by an electric motor 10. Damper chambers 11 are connected on the pressure sides of the hydraulic pumps, which are connected via chokes 12 to the connecting lines 13 which connect the shut-off valves 5 and the brake pressure build-up valves 6. Furthermore, the vehicle brake system 1 has an intake valve 14 in each brake circuit I, II, which connects the suction sides of the hydraulic pumps 9 with the brake master cylinder 3. The structure and function of such slip-regulated vehicle brake systems 1 are known and will not be explained in more detail here.

In a brake circuit I, a brake master cylinder pressure sensor 25 is connected to the brake master cylinder 3. Also, in each of the two brake circuits I, II, a pressure sensor 26, 27 is connected between the shut-off valve 5 and the brake pressure build-up valves 6. This has the advantage that only one pressure sensor 26, 27 is present for each brake circuit I, II, instead of one pressure sensor for each wheel brake 4. A further advantage is better slip regulation of all vehicle wheels when the pressures in the brake circuits are known instead of the wheel brake pressures.

Figure 2:
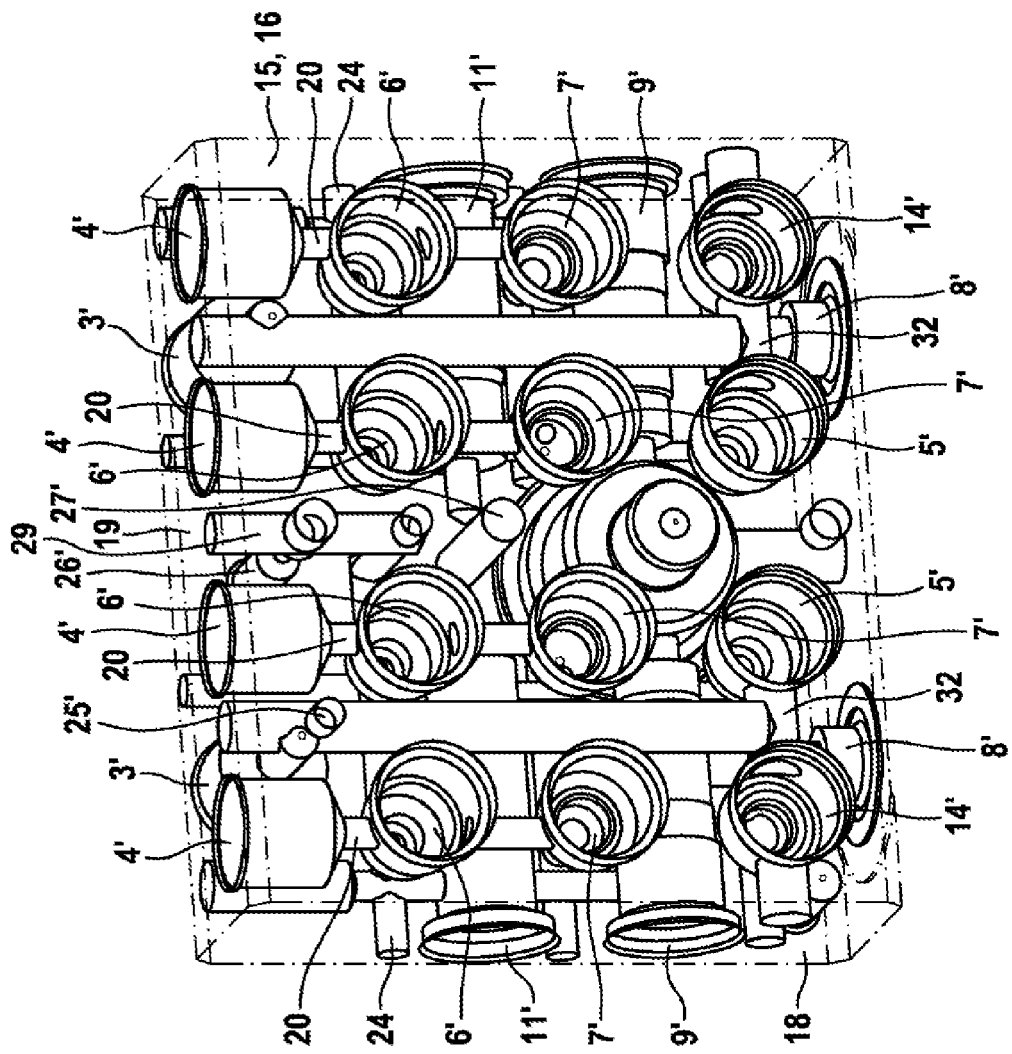
FIG. 2 a perspective, front view of a hydraulic block according to the disclosure.
Figure 3:
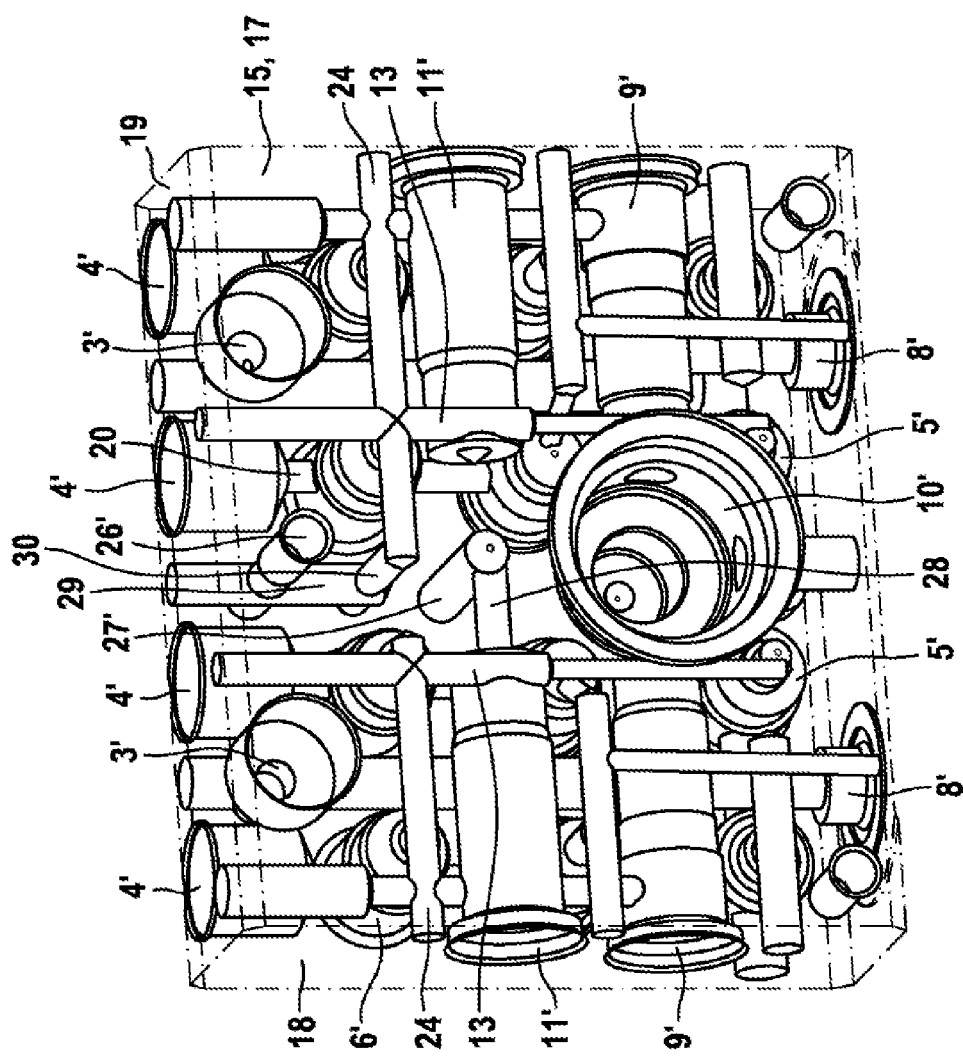
FIG. 3 a perspective, rear view of the hydraulic block in FIG. 2.

The hydraulic components of the hydraulic assembly 2 of the slip control system of the vehicle brake system 1 are housed in a hydraulic block 15 shown in FIGS. 2 and 3. The hydraulic block 15 serves for mechanical fixing and hydraulic connection of the hydraulic components of the hydraulic assembly 2 or of the slip control system of the vehicle brake system 1. It contains hydraulic parts of the components in receivers, installation spaces or similar of the hydraulic block, while electrotechnical and electromechanical parts, such as coils and rotors of the magnetic valves, protrude outward from the hydraulic block 15. The electric motor 10 for driving the hydraulic pumps 9 is attached to the outside of the hydraulic block 15. The hydraulic block 15 is drawn without fittings, i.e. without the hydraulic components. The receivers are cylindrical bores, in some cases with stepped diameters, in the hydraulic block 15; for the hydraulic connections, bores are produced as connecting lines or generally as lines in the hydraulic block 15. The receivers and lines are arranged parallel or at right angles to each other and to the edges and outer faces of the hydraulic block 15, i.e. in a Cartesian coordinate system. The hydraulic block 15 is squat and cuboid, its thickness is approximately one-quarter of its length or width, and in front view it is almost square. For clearer designation and distinction, the flat side of the hydraulic block 15 shown in FIG. 2 is designated the front 16, the flat side shown in FIG. 3 is the rear 17, and the side faces are the longitudinal sides 18 and transverse sides 19. The hydraulic block 15 is mirror-symmetrical to a theoretical longitudinal center plane.

On one transverse side 19, the hydraulic block 15 has four ports 4' for the wheel brakes 4 which are arranged next to each other in a row. The term 'in a row' in the exemplary embodiment means that ports 4' etc. are arranged next to each other on a theoretical straight line. The ports 4' are cylindrical blind holes, from which at least one line 20 leads to other ports, receivers for magnetic valves, installation spaces for hydraulic pumps, hydraulic accumulators and/or damper chambers. The lines are bores in the hydraulic block 15 which, when not originating from a port, a receiver or an installation space, are hermetically sealed at an opening on one of the sides 16, 17, 18, 19 of the hydraulic block 15, for example with a pressed-in ball.

The ports 4' may have internal threads for connection of wheel brake lines, or may be provided for caulking, for example crimping, for connection of the wheel brake lines. 'Arranged on the transverse side 19 of the hydraulic block 15' means that the ports 4' are open at this transverse side 19 so that the wheel brake lines may be connected. 'Arranged at the installation spaces for the hydraulic pumps and hydraulic accumulators on a side of the hydraulic block 15' means that the installation spaces are open at this side of the hydraulic block 15, so that the hydraulic pumps or hydraulic accumulators can be inserted or installed from this side. The same applies to the receivers for the magnetic valves.

On the rear 17 of the hydraulic block 15, two ports 3' for the two brake circuits I, II of the brake master cylinder 3 are arranged at a distance from the transverse side 19 of the hydraulic block 15 corresponding approximately to a depth of the ports 4' for the wheel brakes 4. The ports 3' for the brake master cylinder 3 are each arranged between an outer and an inner port 4' for the wheel brakes 4.

Four receivers 6' for the brake pressure build-up valves 6 are arranged in a row next to each other on the front 16 of the hydraulic block 15, adjacent to the ports 3' for the brake master cylinder 3. The receivers 6' for the brake pressure build-up valves 6 are connected to the ports 4' for the wheel brakes 4 by the abovementioned lines 20.

Ports 7' for the brake pressure reduction valves 7 are arranged next to each other on the front 16 of the hydraulic block 15, in a further row parallel to the ports 6' for the brake pressure build-up valves 6, on a side of the receivers 6' for the brake pressure build-up valves 6 facing away from the ports 4' for the wheel brakes 4.

Adjacent to the receivers 7' for the brake pressure reduction valves 7 are installation spaces 9' for the hydraulic pumps 9, which are arranged, i.e. are open, on the longitudinal sides 18 of the hydraulic block 15 and run parallel to the rows of successively arranged receivers 6', 7' for the brake pressure build-up valves 6 and the brake pressure reduction valves 7. The installation spaces 9' for the hydraulic pumps 9 extend comparatively deeply into the hydraulic block 15 and, after two diameter-reducing steps, open radially into a cam chamber 10' for a pump cam (not shown here) which is arranged rotationally fixedly on a shaft of the electric motor 10 which drives the hydraulic pumps 9 configured as piston pumps. The cam chamber 10' is open at the rear 17 of the hydraulic block 15 and lies in a middle between the installation spaces 9' for the hydraulic pumps 9. The electric motor 10 (not shown) is attached on the outside at the rear 17 of the hydraulic block 15, coaxially to the cam chamber 10'.

In a further row parallel to the rows of the receivers 6', 7' for the brake pressure build-up valves 6 and the brake pressure reduction valves 7, on a side of the installation spaces 9' for the hydraulic pumps 9 facing away from the receivers 6', 7' for the brake pressure build-up valves 6 and brake pressure reduction valves 7, four receivers 5', 14' for the shut-off valves 5 and the intake valves 14 are arranged next to each other on the front 16 of the hydraulic block 15. The receivers 5' for the shut-off valve 5 are arranged between the receivers 14' for the intake valves 14.

Two installation spaces 8' for the hydraulic accumulators 8 are arranged adjacent to the row of receivers 5', 14' for the shut-off valves 5 and intake valves 14. The installation spaces 8' are arranged on a transverse side of the hydraulic block 15 which lies opposite the transverse side 19 containing the ports 4' for the wheel brakes 4.

Two installation spaces 11' for the damper chambers 11 are arranged between the two rows of receivers 6', 7' for the brake pressure build-up valves 6 and the brake pressure reduction valves 7. The installation spaces 11' for the damper chambers 11 are arranged on the longitudinal sides 18 of the hydraulic block 15, i.e. they are open there for the installation of the damper chambers 11, and they run parallel to the rows of installation spaces 6', 7' for the brake pressure build-up valves 6 and the brake pressure reduction valves 7. The receivers 6', 7' for the brake pressure build-up valves 6 and the brake pressure reduction valves 7 are, as stated, arranged on the front 16 of the hydraulic block 15. The installation spaces 11' for the damper chambers 11 are arranged in the hydraulic block 15 close to the rear 17 of the hydraulic block 15, viewed from the top 16 of the hydraulic block 15 therefore below the receivers 6', 7' for the brake pressure build-up valves 6 and brake pressure reduction valves 7.

Perforated discs 12', forming chokes 12, are inserted in the installation spaces 11' for the damper chambers 11. The installation spaces 11' for the installation chambers 11 are hermetically sealed pressure-resistantly with covers 21 which are inserted in the openings of the installation spaces 11' for the damper chambers 11 and welded, for example ultrasonically welded, or caulked. In hydraulic terms, the discs 12' which form the chokes 12 are situated between the hydraulic accumulators 11 on the one side and the shut-off valves 5 and brake pressure build-up valves 6 on the other side of the discs 12'.

At their base, the installation spaces 11' for the damper chambers 11 are connected, via short joining lines 22 running axially parallel to the installation spaces 11' (see FIG. 3), to the connecting lines 13 which connect the receivers 5' for the shut-off valves 5 to the receivers 6' arranged on the inside for the brake pressure build-up valves 6. The receivers 6' arranged on the outside for the other two brake pressure build-up valves 6 are connected via transverse bores 24 to the receivers 6' arranged on the inside for the brake pressure build-up valves 6. The lines 13 run parallel to the longitudinal sides 18 of the hydraulic block 15 and perpendicular to the installation spaces 9' for the hydraulic pumps 9 and the installation spaces 11' for the damper chambers 11. The lines 13 open at the narrow side 19 on which the ports 4' for the wheel brakes 4 are arranged, and are there hermetically sealed pressure-resistantly by pressed-in balls (not shown). The joining lines 22 of the installation chambers 11' for the choke chambers 11 to the connecting lines 13 are, as stated, arranged axially parallel to the installation spaces 11' and eccentrically at a point of a periphery of the installation spaces 11' facing the transverse side 19 of the hydraulic block 15 containing the ports 4' for the wheel brakes 4. This allows or simplifies purging on filling of the pre-assembled hydraulic block 15 with brake fluid, i.e. when it is prefitted with the hydraulic components of the slip control system of the vehicle brake system 1.

Due to the arrangement of the installation spaces 11' for the damper chambers 11 between the receivers 6' for the brake pressure build-up valves 6 and the receivers 7' for the brake pressure reduction valves 7, the damper chambers 11 can be accommodated space-savingly in the hydraulic block 15.

The hydraulic block 15 is drilled in a Cartesian pattern, i.e. the receivers, installation spaces, lines are drilled parallel or at right angles to each other and to the sides of the hydraulic block 15.

In the longitudinal center plane, the hydraulic block has two receivers 26', 27' for the two pressure sensors 26, 27 for measuring the brake pressures in the two brake circuits I, II. One of the two receivers 27' is arranged on the front 16 between the two rows of receivers 6', 7' for the brake pressure build-up valves 6 and the brake pressure reduction valves 7. This receiver 27' for the pressure sensor 27 communicates via a short transverse line 28 with one of the two installation spaces 11' for a damper chamber 11, in the base of which the transverse line 28 opens. Close to their bases, the installation spaces 11' for the damper chambers 11 are intersected by the connecting lines 13 which run parallel to the longitudinal center plane in the hydraulic block 15 and open on the transverse side 19 containing the ports 4' for the wheel brakes 4. The openings of the connecting lines 13 are sealed pressure-tightly by pressed-in balls. The connecting lines 13 run on both sides of the cam chamber 10'. Transverse bores 24 which open into the connecting lines 13 connect the two receivers 6' for the brake pressure build-up valves 6 of the respective brake circuit I, II to the assigned connecting line 13. The connecting lines 13 terminate at the receivers 5' for the shut-off valves 5, so that the receiver 27' for the pressure sensor 27 for the one brake circuit is connected via the transverse bore to the connecting line 13 of the one brake circuit which connects the receiver 5' for the shut-off valve 5 with the receivers 6' for the brake pressure build-up valves 6 of this brake circuit.

The other receiver 26' for the pressure sensor 26 of the other brake circuit is, as stated, also arranged in the longitudinal center plane of the hydraulic block 15, but on the opposite side i.e. the rear 17, and is offset in the direction of the transverse side 19 of the hydraulic block 15 containing the ports 4' for the wheel brakes 4. The receiver 26' for the pressure sensor 26 is arranged on a side of the receivers 6' for the brake pressure build-up valves 6 facing away from the receivers 7' for the brake pressure reduction valves 7. It is connected via a short longitudinal bore 29 in the longitudinal center plane of the hydraulic block 15, and via a vertical bore 30 which also lies in the longitudinal center plane of the hydraulic block 15, to the transverse bore 24 which connects the two receivers 6' for the brake pressure build-up valves of the other brake circuit. This transverse bore 24 is extended to the longitudinal center of the hydraulic block 15.

A receiver 25' for the brake master cylinder pressure sensor 25 is arranged between the transverse side 19 of the hydraulic block 15 containing the ports 4' for the wheel brakes 4, and the row of receivers 6' for the brake pressure build-up valves 6. The receiver 25' for the brake master cylinder pressure sensor 25 is situated in a longitudinal plane which runs parallel to the longitudinal center plane between an inner receiver 6' for a brake pressure build-up valve 6 close to the longitudinal center plane and a receiver 6' for a brake pressure build-up valve 6 close to a longitudinal side 18, and also between a receiver 7' for a brake pressure reduction valve 7 close to the longitudinal center plane of the hydraulic block 15 and a receiver 7' for a brake pressure reduction valve 7 close to the longitudinal side 18 of the hydraulic block 15. The receiver 25 for the brake master cylinder pressure sensor 25' is arranged in the region of an imaginary extension of a cylindrical casing surface of one of the two ports 3' for the brake master cylinder, wherein the port 3' is arranged on the rear 17 and opposite the receiver 25 for the brake master cylinder pressure sensor 25 on the front 16 of the hydraulic block 15. Due to the arrangement of the receiver 25 for the brake master cylinder pressure sensor 25 inside the casing surface of the port 3' for the brake master cylinder, the receiver 25' for the brake master cylinder pressure sensor 25 can connect to a vertical bore 31 on a short path.

The receivers 5', 14' for the shut-off valves 5 and intake valves 14 are connected via a transverse bore 32 to the joining line 13 of the respective brake circuit I, II. The vertical bore 31 connects the receiver 25' for the brake master cylinder pressure sensor 25 to the port 3' of the brake master cylinder 3.

The invention claimed is:

1. A hydraulic block for a hydraulic assembly of a slip-regulated, hydraulic vehicle brake system, comprising:
   a first plurality of receivers each configured to fluidly connect to a respective brake pressure build-up valve of the hydraulic vehicle brake system, each of the first plurality of receivers aligned next to each other in a first row;
   a second plurality of receivers each configured to fluidly connect to a respective brake pressure reduction valve of the hydraulic vehicle brake system, each of the second plurality of receivers aligned next to each other in a second row parallel to the first row and spaced from the first row in a first direction; and
   a first further receiver configured to fluidly connect to a brake master cylinder pressure sensor, the first further receiver located perpendicularly offset from the first row in a second direction opposite the first direction and within a plane that extends orthogonal to the first row between two of the first plurality of receivers and between two of the second plurality of receivers and that is outside of a center plane of the hydraulic block that is orthogonal to the first row.

2. The hydraulic block as claimed in claim 1, further comprising:
   a port configured to fluidly connect to a brake master cylinder and defining an outer circumferential casing surface,
   wherein an imaginary extension of the outer circumferential casing surface casing surface defines a cylindrical region extending through the hydraulic block, and the first further receiver is located in the cylindrical region.

3. The hydraulic block as claimed in claim 2, wherein the first further receiver is defined in a first side of the hydraulic block and the port is defined in a second opposite side of the hydraulic block.

4. The hydraulic block as claimed in claim 1, further comprising:
   a second further receiver and a third further receiver each configured to fluidly connect to at least one of a shut-off valve and an intake valve, the second further receiver and the third further receiver aligned next to each other in a third row parallel to the first row and the second row,
   wherein the second further receiver and the third further receiver are fluidly connected via a transverse bore with a connecting line which runs outside the center plane of the hydraulic block between two of the first plurality of receivers and between two of the second plurality of receivers, and
   wherein the second further receiver and the third further receiver fluidly communicate with a port that is configured to fluidly connect to a brake master cylinder.

5. A hydraulic block for a hydraulic assembly of a slip-regulated, hydraulic vehicle brake system, comprising:
   a first plurality of receivers each configured to fluidly connect to a respective brake pressure build-up valve of the hydraulic vehicle brake system, each of the first plurality of receivers aligned next to each other in a first row;
   a second plurality of receivers each configured to fluidly connect to a respective brake pressure reduction valve of the hydraulic vehicle brake system, each of the second plurality of receivers aligned next to each other in a second row parallel to the first row and spaced from the first row in a first direction;
   a first further receiver configured to fluidly connect to a brake master cylinder pressure sensor, the first further receiver located, perpendicularly offset from the first row in a second direction opposite the first direction and within a plane that extends between two of the first plurality of receivers and between two of the second plurality of receivers and that is outside of a center plane defined by the hydraulic block; and
   a second further receiver configured to fluidly connect to a pressure sensor for a first brake circuit of the vehicle brake system, the second further receiver located in the center plane of the hydraulic block.

6. The hydraulic block as claimed in claim 5, wherein the second further receiver is located outside of a space defined between the first row and the second row.

7. The hydraulic block as claimed in claim 5, wherein the second further receiver is located between the first row and the second row.

8. The hydraulic block as claimed in claim 5, further comprising:
   a third further receiver configured to fluidly connect to a pressure sensor for a second brake circuit of the vehicle brake system, wherein the second further receiver and the third further receiver are located on opposite sides of the hydraulic block.

9. The hydraulic block as claimed in claim 5, further comprising:
a fourth further receiver configured to fluidly communicate with a damper chamber,
wherein the second further receiver fluidly communicates with the fourth further receiver.

10. A hydraulic vehicle brake system, comprising:
a first brake circuit;
a second brake circuit;
a first shut-off valve positioned in the first brake circuit;
a second shut-off valve positioned in the second brake circuit;
a first brake pressure build-up valve positioned in the first brake circuit;
a second brake pressure build-up valve positioned in the second brake circuit;
a first brake pressure reduction valve positioned in the first brake circuit;
a second brake pressure reduction valve positioned in the second brake circuit;
a plurality of wheel brakes;
a brake master cylinder, wherein at least one of the plurality of wheel brakes is fluidly connected via the first shut-off valve and the first brake pressure build-up valve to the brake master cylinder, and at least one other of the plurality of wheel brakes is fluidly connected via the second shut-off valve and the second brake pressure build-up valve to the brake master cylinder;
a first pressure sensor configured to sense a pressure of the brake master cylinder; and
a hydraulic block comprising:
a first receiver fluidly connected to the first brake pressure build-up valve;
a second receiver fluidly connected to the second brake pressure build-up valve, the first receiver and the second receiver being aligned next to each other in a first row;
a third receiver fluidly connected to the first brake pressure reduction valve;
a fourth receiver fluidly connected to the second brake pressure reduction valve, the third and fourth receivers being aligned next to each other in a second row parallel to the first row and spaced from the first row in a first direction; and
a first further receiver fluidly connected to the first pressure sensor, the first further receiver located perpendicularly offset from the first row in a second direction opposite the first direction and within a plane that extends orthogonal to the first row between the first and second receivers and between the third and fourth receivers and that is outside of a center plane of the hydraulic block that is orthogonal to the first row.

11. The hydraulic vehicle brake system as claimed in claim 10, wherein:

the hydraulic block further comprises a port fluidly connected to the brake master cylinder, the port defining an outer circumferential casing surface; and
an imaginary extension of the outer circumferential casing surface casing surface defines a cylindrical region extending through the hydraulic block, and the first further receiver is located in the cylindrical region.

12. The hydraulic vehicle brake system as claimed in claim 11, wherein the first further receiver is defined in a first side of the hydraulic block and the port is defined in a second opposite side of the hydraulic block.

13. The hydraulic vehicle brake system as claimed in claim 10, wherein:
the hydraulic block further comprises a fifth receiver fluidly connected to the first shut-off valve and a sixth receiver fluidly connected to the second shut-off valve, the fifth receiver and the sixth receiver being aligned next to each other in a third row parallel to the first row and the second row;
the second further receiver and the third further receiver are fluidly connected via a transverse bore with a connecting line which runs outside the center plane of the hydraulic block between the first and second receivers and between the third and fourth receivers; and
the hydraulic block further comprises a port fluidly connected to the brake master cylinder, the fifth receiver and the sixth receiver being in fluid communication with the port.

14. The hydraulic vehicle brake system as claimed in claim 10, further comprising:
a second pressure sensor positioned hydraulically between the first shut-off valve and the first brake pressure build-up valve in the first brake circuit,
wherein the hydraulic block further comprises a second further receiver configured to fluidly connect to the second pressure sensor, the second further receiver located in the center plane of the hydraulic block.

15. The hydraulic vehicle brake system as claimed in claim 14, wherein the second further receiver is located outside of a space defined between the first row and the second row.

16. The hydraulic vehicle brake system as claimed in claim 14, wherein the second further receiver is located between the first row and the second row.

17. The hydraulic vehicle brake system as claimed in claim 14, further comprising:
a third pressure sensor positioned hydraulically between the second shut-off valve and the second brake pressure build-up valve in the second brake circuit,
wherein the hydraulic block further comprises a third further receiver fluidly connected to the third pressure sensor, the second further receiver and the third further receiver being located on opposite sides of the hydraulic block.

18. The hydraulic vehicle brake system as claimed in claim 14, further comprising:
a damper chamber positioned in the first brake circuit,
wherein the hydraulic block further comprises a fourth further receiver in fluid communication with the damper chamber and with the second further receiver.

* * * * *